US012717598B2

(12) United States Patent
Sunil Satyanarayan et al.

(10) Patent No.: US 12,717,598 B2
(45) Date of Patent: Aug. 25, 2026

(54) SYSTEM AND METHOD FOR AUTOMATING VIDEO GENERATION BASED ON HISTORICAL VISITS TO A WEBSITE

(71) Applicant: Bank of America Corporation, Charlotte, NC (US)

(72) Inventors: Fnu Sunil Satyanarayan, High Point, NC (US); Daniel Zaccardelli, Charlotte, NC (US); Vijaykumar Rajkumar Goyal, East Windsor, NJ (US); Gayatri Samudrala, Telangana (IN); Srinivasrao Lalam, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 324 days.

(21) Appl. No.: 18/629,618

(22) Filed: Apr. 8, 2024

(65) Prior Publication Data

US 2025/0315281 A1 Oct. 9, 2025

(51) Int. Cl.

| | |
|---|---|
| ***G06F 9/451*** | (2018.01) |
| ***G06F 3/0484*** | (2022.01) |
| ***G06F 16/954*** | (2019.01) |

(52) U.S. Cl.

CPC ............ *G06F 9/453* (2018.02); *G06F 3/0484* (2013.01); *G06F 16/954* (2019.01)

(58) Field of Classification Search

CPC ...... G06F 9/453; G06F 3/0484; G06F 16/954; H04N 21/47217; H04N 21/8456; H04N 21/8545; H04N 21/8541; H04L 67/02; H04L 67/535

See application file for complete search history.

(56) References Cited

U.S. PATENT DOCUMENTS

| | | | |
|---|---|---|---|
| 8,006,268 | B2 | 8/2011 | Sloo |
| 8,108,257 | B2 | 1/2012 | Sengamedu |
| 8,209,720 | B2 | 6/2012 | Potrebic et al. |
| 8,589,973 | B2 | 11/2013 | Chen et al. |
| 8,656,438 | B2 | 2/2014 | Kahn et al. |
| 8,706,898 | B2 | 4/2014 | Wei et al. |
| 8,806,341 | B2 | 8/2014 | Wei et al. |

(Continued)

OTHER PUBLICATIONS

Fnu Sunil Satyanarayan, U.S. Appl. No. 18/629,702, filed Apr. 8, 2024, "System and method for generating dynamic videos based on HTML code of visited sections of a website."

*Primary Examiner* — Andrey Belousov

(57) ABSTRACT

A system for generating a video based on historical visits to a website is disclosed. The system determines that a first user wants to perform a first task on the website. In response, the system detects a navigation path that is being traversed thought the website and associates the navigation path with the first task. The system generates a first video that comprises one or more video scenes of visited sections. The system detects that a second user wants to perform the first task on the website. In response, the system fetches a code portion associated with the sections, generates one or more video scenes based on the fetched code portions, and generates a second video that comprises the one or more video scenes. The system displays the generated video on the website, where the second video shows the navigation path to perform the first task on the website.

20 Claims, 5 Drawing Sheets

(56) References Cited

U.S. PATENT DOCUMENTS

| | | | | |
|---|---|---|---|---|
| 8,813,127 | B2 | 8/2014 | Liu et al. | |
| 9,172,994 | B2 | 10/2015 | Sinha et al. | |
| 9,743,147 | B2 | 8/2017 | Goodwin et al. | |
| 9,838,747 | B2 | 12/2017 | Olague et al. | |
| 9,967,161 | B2 | 5/2018 | Kellicker | |
| 10,284,917 | B2 | 5/2019 | Pearson et al. | |
| 10,320,503 | B2 | 6/2019 | Sweatt et al. | |
| 10,356,742 | B2 | 7/2019 | Teller et al. | |
| 10,390,095 | B2 | 8/2019 | Feder et al. | |
| 10,645,456 | B2 | 5/2020 | Schmidt et al. | |
| 10,826,807 | B2 | 11/2020 | Kellicker | |
| 11,039,218 | B1 | 6/2021 | April et al. | |
| 11,237,708 | B2 | 2/2022 | Sangoli | |
| 11,461,535 | B2 | 10/2022 | Sangoli | |
| 11,539,989 | B2 | 12/2022 | Swan et al. | |
| 11,594,028 | B2 | 2/2023 | Stojancic et al. | |
| 2021/0373725 | A1 | 12/2021 | Sangoli | |
| 2024/0404560 | A1* | 12/2024 | He | G09B 5/065 |
| 2025/0117516 | A1* | 4/2025 | Hunsberger | G06F 21/107 |
| 2025/0322574 | A1* | 10/2025 | Kalish | G06F 40/221 |

* cited by examiner

SYSTEM AND METHOD FOR AUTOMATING VIDEO GENERATION BASED ON HISTORICAL VISITS TO A WEBSITE

TECHNICAL FIELD

The present disclosure relates generally to video generation, and more specifically to a system and method for automating a video generation based on historical visits to a website.

BACKGROUND

Organizations may present their services and/or products on their websites. Users may visit the website of an organization to perform tasks, such as accessing a service, accessing a product, opening a new profile, and accessing a piece of certain information, among others. In current systems, users have to investigate how to perform their desired tasks on the website. This often leads to users repeatedly navigating to many web pages of the website to be able to figure out how to perform their desired task. As a result, the different web pages of the website may be buffered and loaded multiple times before the user can perform the task.

SUMMARY

The system described in the present disclosure is particularly integrated into practical applications of improving dynamic video generation techniques and improving the functioning of computer systems that are tasked with generating videos. Furthermore, the disclosed system introduces an unconventional method to generate a dynamic and interactive video with HyperText Markup Language (HTML) code. This approach provides technical advantages and improvements, such as reduced computing and network resource requirements, leading to decreased loading and buffering times for the web content.

Organizations may present their services and/or products on their websites. Users may visit the website of an organization to perform tasks, such as accessing a service, accessing a product, opening a new profile, and accessing a piece of certain information, among others. In current systems, users have to investigate how to perform their desired tasks on the website. This often leads to user repeatedly navigating to many web pages of the website to be able to figure out how to perform their desired task. As a result, the different web pages of the website may be buffered and loaded multiple times before the user can perform the task. Such an approach not only consumes significant processing, memory, and network resources but also results in a less-than-optimal user experience. The need for users to manually investigate and explore the website to perform tasks can be time-consuming, and inefficient, and wastes processing, memory, and network resources for caching, buffering, and loading the content of the website.

The disclosed system provides technical solutions to these and other technical problems. More specifically, the disclosed system offers several technical advantages, including enabling the creation of interactive videos presented as a series of HTML pages to help users perform the task more efficiently with the aid of the video. For example, by generating the video, the user is able to perform the task by viewing the video where the sections used to perform the task are displayed in a series of video scenes. Thus, the web pages of the website do not have to be buffered and loaded so the user can perform the task, and the task can be performed in less time. Thus, the disclosed system reduces the processing, memory, and network resources for the task to be performed compared to current systems.

Furthermore, the disclosed system introduces an unconventional approach that allows users to engage with embedded HTML links, buttons, and other interactive elements within the video's HTML pages. Thus, the generated video becomes dynamic and interactive, distinct from traditional video formats. For example, if the user changes or interacts with an element displayed in the video, the element's status is updated according to the type of user interaction.

Furthermore, in contrast to conventional systems that typically use formats, such as MP4, MOV, or AVI, rendering and streaming videos as a series of HTML pages may be performed with fewer computing, memory, and network resources. This, at least partially, is due to a reduced size of the HTML code that is to be rendered on a video scene compared to the large size of a series of video frames in a typical video format which includes pixel values to fill the entire field of each video frame. Furthermore, in a high-resolution video format, where the number of pixels in each video frame is increased, the demand for computing resources and network bandwidth further escalates due to the larger file sizes associated with high-resolution video formats.

Generating a video based on HTML pages reduces processing, memory, and network resource requirements to generate the video because of the reduced size of the HTML pages compared to traditional video formats. This further leads to a decrease in loading and buffering times for web content, which in turn increases the responsiveness of the disclosed system while conserving computational and network resources.

Moreover, the disclosed system not only spends fewer computing, memory, and network resources to generate, render, and stream a video of a series of HTML pages, it also provides the capability of generating an updated video with the current status of the sections of interest by fetching the current HTML code portions of the sections of interest. Thus, the videos are dynamically updated based on the current HTML code of the sections of interest.

In this manner, the disclosed system improves the video generation techniques and functioning of computer systems that are involved in generating and presenting videos comprising rendered HTML pages.

System and Method for Generating Dynamic Videos Based on HTML Code of Visited Sections of a Website In some embodiments, a system for generating a dynamic video based on webpage sections comprises a memory operably coupled with a processor. The memory is configured to store code associated with a website. The processor is configured to detect a set of sections of a first webpage of the website, wherein the set of sections of the first webpage comprises at least one of a chart, a text field, or a graph. The processor is further configured to generate a user interface component for a first section from among the set of sections of the first webpage, wherein the user interface component comprises a button. The processor is further configured to display the generated user interface component associated with the first section on the first webpage. The processor is further configured to detect that a first user interface component associated with a first section of the first webpage is actuated. The processor is further configured to add the first section of the first webpage to a first video, in response to detecting that the first user interface component associated with the first section of the first webpage is actuated. The first video is associated with performing a first task on the website. The processor is further configured to receive a request to generate the first video. In response to receiving the request, the processor is further configured to fetch a first code portion associated with the first section of the first webpage from the memory. The processor is further configured to generate a first video scene displaying the first section, wherein the first video scene is generated in response to loading the first code portion. The processor is further configured to generate the first video comprising the first video scene.

System and Method for Automating a Video Generation Based on Historical Visits to a Website In some embodiments, a system for a video generation based on historical visits to a website comprises a memory operably coupled to a processor. The memory is configured to store code associated with a website. The processor is configured to determine that a first user wants to perform a first task on the website. In response to determining that the first user wants to perform the first task on the website, the processor is further configured to detect a navigation path that is being traversed through the website, wherein the navigation path is detected in response to detecting user interaction with one or more sections of the website. The processor is further configured to associate the detected navigation path with the first task. The processor is further configured to generate a first video that comprises one or more first video scenes displaying the one or more sections. The processor is further configured to determine that a second user wants to perform the first task on the website. In response to determining that the second user wants to perform the first task on the website, the processor is further configured to fetch a code portion associated with the one or more sections. The processor is further configured to generate one or more second video scenes based at least in part upon the fetched code portion, wherein the generated one or more second video scenes display an updated status of the one or more sections. The processor is further configured to generate a second video that comprises the one or more second video scenes. The processor is further configured to display the generated second video on the website, wherein the second video shows the navigation path to perform the first task on the website.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
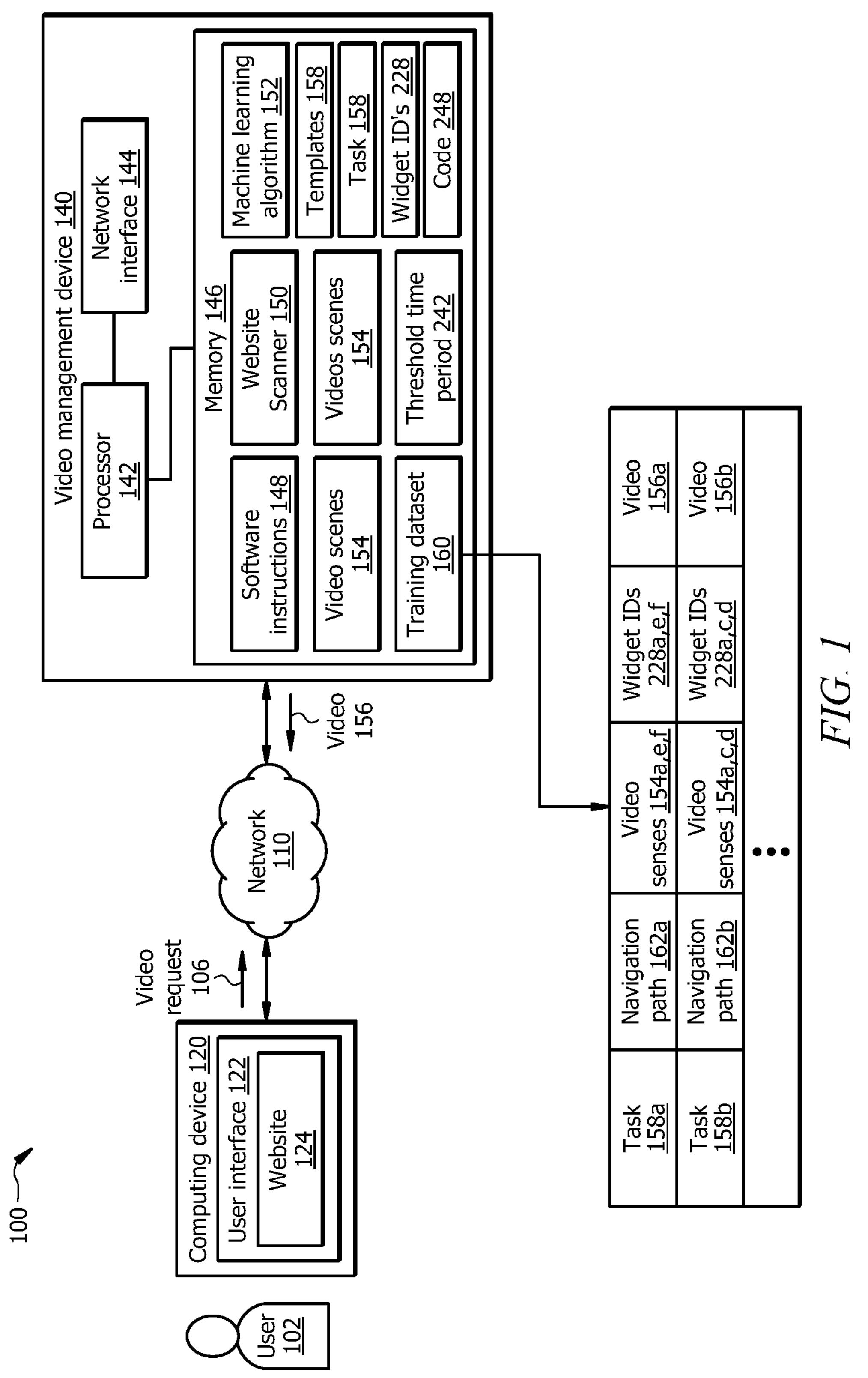
FIG. 1 illustrates an embodiment of a system configured to generate a dynamic video based on visited webpage sections.
Figure 2:
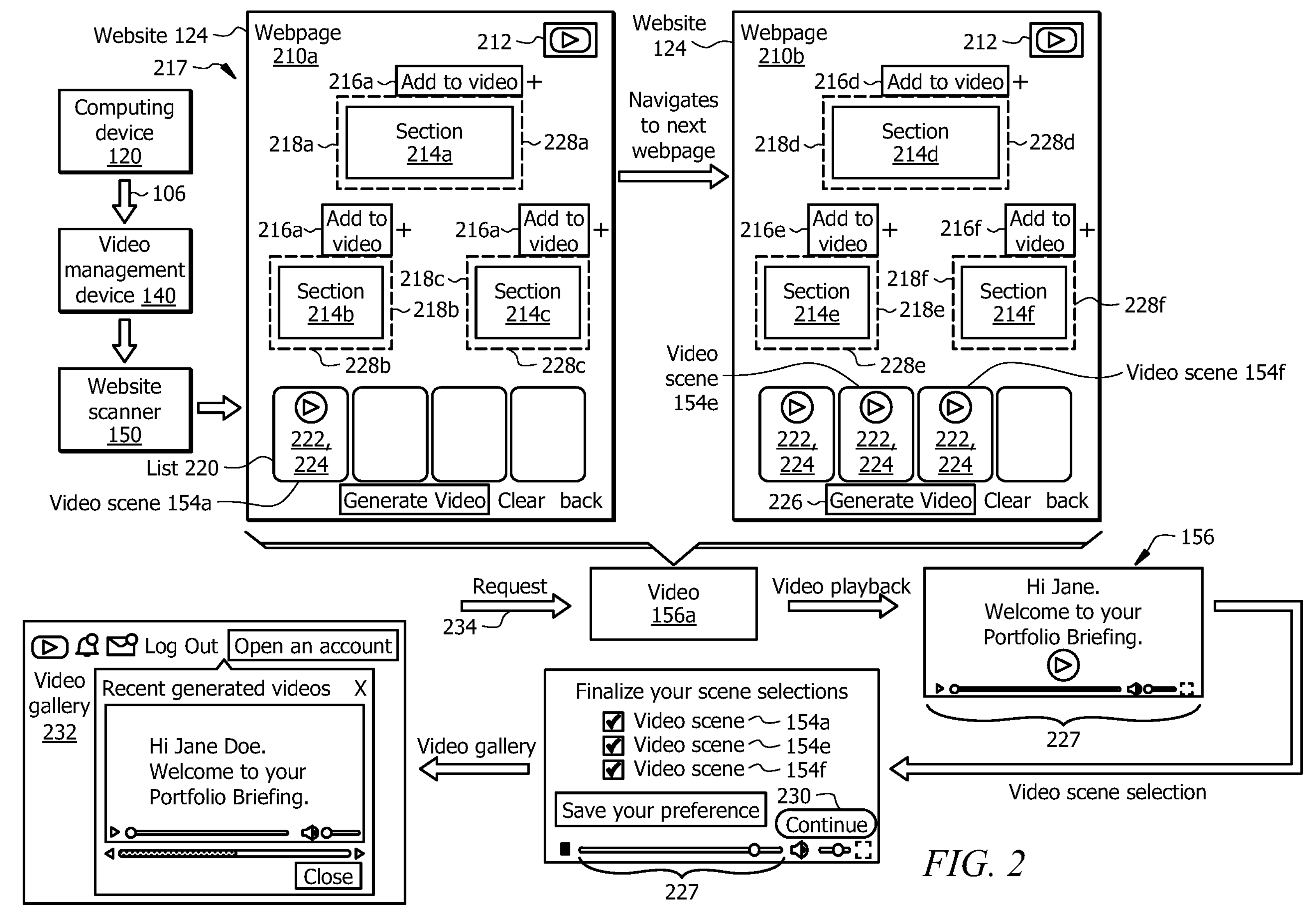
FIG. 2 illustrates an example operational flow of the system of FIG. 1 for generating dynamic videos based on HTML code of visited sections of a website.
Figure 3:
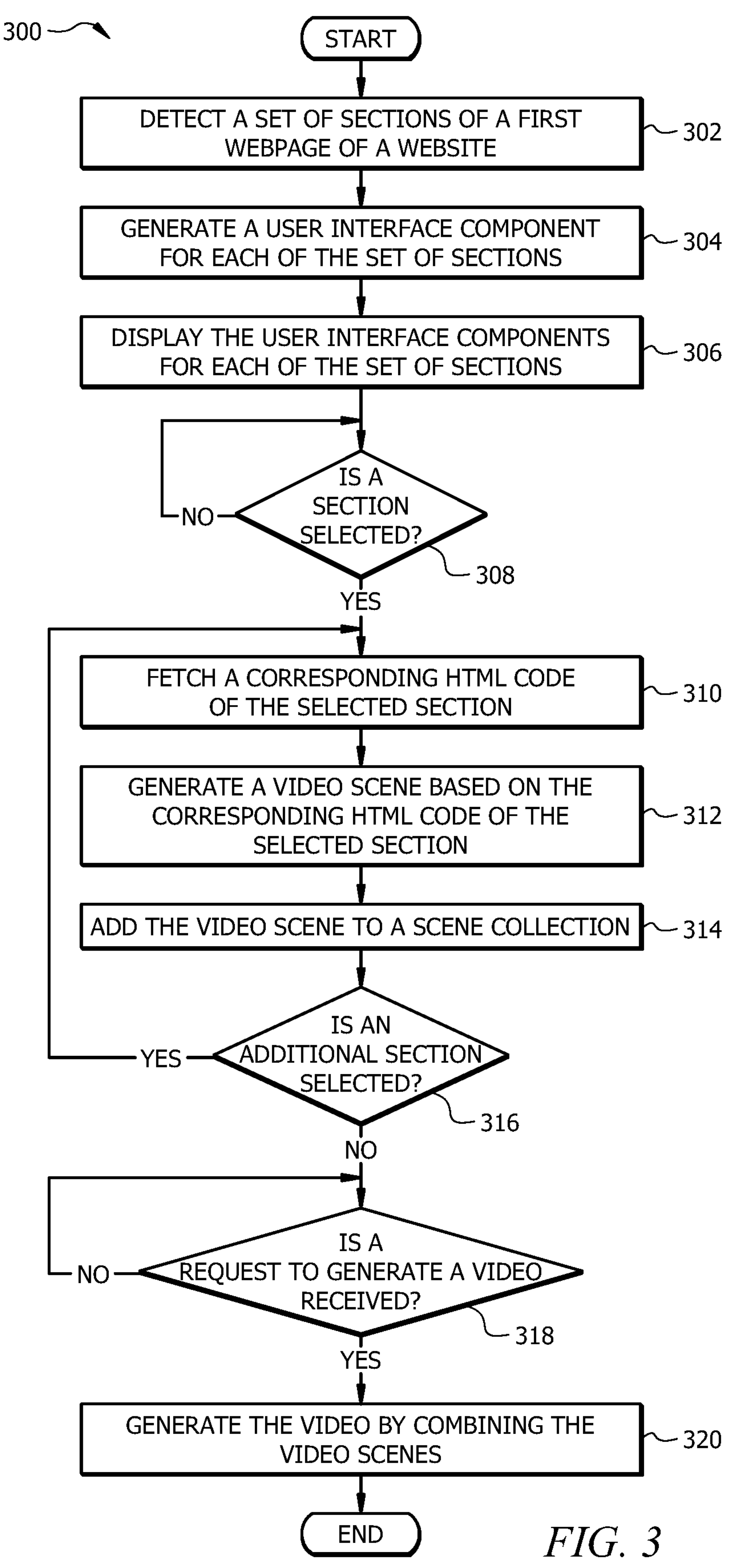
FIG. 3 illustrates an example flowchart of a method to generate a dynamic video based on webpage sections.

As described above, previous technologies fail to provide efficient and reliable solutions to generate a dynamic video based on visited web page sections. Embodiments of the present disclosure and its advantages may be understood by referring to FIGS. 1 through 5. FIGS. 1 through 3 are used to describe systems and methods to generate a dynamic video based on webpage sections, according to some embodiments, and systems and methods to automate a video generation process based on historical visits to a website.

System Overview

FIG. 1 illustrates an embodiment of a system 100 that is generally configured to generate an interactive video in the form of a series of rendered code (e.g., Hypertext Markup Language (HTML)) pages or HTML video scenes 154. In some embodiments, the system 100 comprises a video management device 140 communicatively coupled with a computing device 120 via a network 110. The network 110 enables communication among the components of the system 100. A user 102 may send a video request 106 via the computing device 120 to the video management device 140. For example, the user 102 may press a button on the website 126 indicating that they want to start selecting sections of the website 126 to be added to video 156. The video management device 140 may receive the video request 106, receive the user's selection of sections of the website 126, and generate the video 156 that comprises a series of HTML video scenes corresponding to the selected sections of the website 126. The generated video 156 is interactive and not a series of static images, meaning that the viewer can actively engage with the content through embedded HTML links, buttons, and other interactive elements within each HTML video scene 154. This interactivity is made possible by the unconventional technique of rendering the video 156 as a series of HTML pages rather than traditional formats, including MP4, MOV, or AVI. In other embodiments, system 100 may not have all of the components listed and/or may have other elements instead of, or in addition to, those listed above.

In general, the system 100 introduces an unconventional method to generate a dynamic and interactive video 156 with HTML code. This approach provides technical advantages and improvements such as reduced computing and network resource requirements, leading to decreased loading and buffering times for the web content.

Organizations may present their services and/or products on their websites 124. Users 102 may visit a website 124 of an organization to perform tasks 158, such as accessing a service, accessing a product, opening a new profile, and accessing a piece of certain information, among others. In current systems, users 102 have to investigate how to perform their desired task 158 on the website 124. This often leads to user 102 navigating to many web pages to be able to figure out how to perform their desired task 158. Thus, the different web pages of the website 124 may be buffered and loaded multiple times before the user 102 can perform the task 158. Such an approach not only consumes significant processing, memory, and network resources but also results in a less-than-optimal user experience. The need for users 102 to manually investigate and explore the website 124 to perform tasks 158 can be time-consuming, and inefficient, and wastes processing, memory, and network resources for caching, buffering, and loading the content of the website 124.

The system 100 provides technical solutions to these and other technical problems. More specifically, the system 100 offers several technical advantages, including enabling the creation of interactive videos 156 presented as a series of HTML pages to help users 102 to perform the task 158 more efficiently with the aid of the video 156. For example, by generating the video 156, the user 102 is able to perform the task 158 in less time and without loading multiple web pages repeatedly. Thus, the system 100 reduces the processing, memory, and network resources for the task 158 to be performed compared to current systems.

Furthermore, the system 100 introduces an unconventional approach that allows users 102 to engage with embedded HTML links, buttons, and other interactive elements within the video's HTML pages. Thus, the generated video 156 becomes dynamic and interactive, distinct from traditional video formats. For example, if the user 102 changes or otherwise interacts with elements displayed in the video 156, the element's status is updated according to the type of user interaction.

Furthermore, in contrast to conventional systems that typically use formats, such as MP4, MOV, or AVI, rendering and streaming videos 156 as a series of HTML pages may be performed with fewer computing, memory, and network resources. This, at least partially, is due to a reduced size of the HTML code that is to be rendered on a video scene 154 compared to the large size of a series of video frames in a typical video format which includes pixel values to fill the entire field of each video frame. Furthermore, in a high-resolution video format, where the number of pixels in each video frame is increased, the demand for computing resources and network bandwidth further escalates due to the larger file sizes associated with high-resolution video formats.

Generating a video 156 by HTML pages, reduces processing, memory, and network resource requirements to generate the video 156 because of the reduced size of the HTML pages compared to traditional video formats. This further leads to a decrease in loading and buffering times for web content, which, in turn, enhances the responsiveness of the disclosed system 100 while conserving computational and network resources.

Moreover, the disclosed system 100 not only spends fewer computing, memory, and network resources to generate, render, and stream a video 156 of a series of HTML pages, it also provides the capability of generating an updated video 156 with the current status of the sections 214 of interest by fetching the current HTML code portions of the sections 214 of interest. Thus, the videos 156 are dynamically updated based on the current HTML code of the sections 214 of interest.

In this manner, the system 100 improves the functioning of computer systems that are involved in generating and presenting videos 156 comprising rendered HTML pages, and the video generation technology.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Computing Device

Computing device 120 may be generally any device that is configured to process data and interact with users 102. Examples of the computing device 120 include but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102. The computing device 120 may include a hardware processor, memory, and/or circuitry configured to perform any of the functions or actions of the computing device 120 described herein.

The computing device 120 may include a hardware processor, memory, and/or circuitry (not explicitly shown) configured to perform any of the functions or actions of the computing device 120 described herein. For example, the computing device 120 includes a processor in signal communication with a network interface and a memory. The memory of the computing device 120 stores software instructions that when executed by the processor of the computing device 120 cause the processor of the computing device 120 to perform one or more operations of the computing device 120 described herein. For example, a software application designed using software code may be stored in the memory of the computing device 120 and executed by the processor of the computing device 120 to perform the functions of the computing device 120. The computing device 120 is configured to communicate with other devices and components of the system 100 via the network 110.

The computing device 120 includes a user interface 122. The user interface 122 may include a monitor screen, a graphical user interface, or any other display mechanism to facilitate user interaction with the computing device. The user interface 122 serves as the visual medium through which the user interacts with the system 100. The user 102 may access the website 124 from the user interface 122. The website 124 may include one or more web pages. The website 124 may have HTML code 248 that when cached and loaded, causes the website 124 to be displayed. The website 124 may have a user interface component (e.g., a button 212 of FIG. 2) that when actuated, the video request 106 is sent to the video management device 140. The video management device 140 may perform certain actions in response to receiving the video request 106. This process is described further below in conjunction with the discussion of FIG. 2.

Video Management Device

The video management device 140 may include one or more hardware computer systems. The video management device 140 may be configured to generate a video 156 comprising one or more video scenes 154. These video scenes 154 are dynamically generated, with each one being based on the HTML code derived from a specific section of the website 124. For example, each video scene 154 may be generated in the form of an HTML page of a respective section (e.g., sections 214 of FIG. 2). In this process, the video management device 140 may parse the HTML code of a section (214 in FIG. 2) to detect its structure, including elements, tags, and attributes. The video management device 140 may then analyze the parsed information to identify various components within the HTML, such as text, images, and interactive elements, such as buttons and links.

Based on this analysis, the video management device 140 may create a formalized layout of the HTML code elements, essentially forming a blueprint for the visual representation of the content in the video scene 154. If the HTML code includes interactive elements, the video management device 140 may preserve these elements in the rendered video scene 154, to allow for user interaction with, for example, buttons and links in the video scene 154.

If the HTML code contains graphical elements, multimedia, or dynamic content, such as animations, the video management device 140 processes and renders these elements to facilitate their accurate representation in the video scene 154. In some embodiments, the video management device 140 may assign animation IDs to different animations within the HTML code, to illustrate temporal organization of the video scene 154. These animation IDs and frames are then mapped to a pre-determined timeline to specify when each element or animation will appear during the video playback.

The video management device 140 combines these elements, including the visual representation of HTML code elements and mapped animations, to generate the final video scene 154. Each video scene 154 contributes to the overall interactive and dynamic video experience. As part of the video 156, the generated video scenes 154 are configured for playback with specified durations, timings of interactive elements, and any transitions or effects specified in the original HTML code. This process allows for aligning the rendered video scene with the user's selected content/section, which provides an interactive experience within the context of the entire video 156.

In certain embodiments, the video management device 140 may be implemented by a cluster of computing devices, such as virtual machines. For example, the video management device 140 may be implemented by a plurality of computing devices using distributed computing and/or cloud computing systems in a network. In certain embodiments, the video management device 140 may be configured to provide services and resources (e.g., data and/or hardware resources) to the components of the system 100. For example, the video management device 140 may be configured to generate dynamic and interactive videos 156 in response to receiving video requests 106.

The video management device 140 comprises a processor 142 operably coupled with a network interface 144 and a memory 146. Processor 142 comprises one or more processors operably coupled to the memory 146. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the video management device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of the operational flow 200 described in FIG. 2, one or more operations of the method 300 as described in FIG. 3, one or more operations of the operational flow 400 described in FIG. 4, and on or more operations of the method 500 as described in FIG. 5.

Network interface 144 is configured to enable wired and/or wireless communications. The network interface 144 may be configured to communicate data between the video management device 140 and other devices, systems, or domains of the system 100. For example, the network interface 144 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, website scanner 150, machine learning algorithm 152, video scenes 154, video streams also interchangeably referred to herein as videos 156, tasks 158, training dataset 160, widget IDs 228 (identifiers), request 234, threshold time period 242, code 248, and/or any other data or instructions. The software instructions 148 may comprise any suitable set of instructions, logic, rules, or code operable to execute the processor 142 and perform the functions described herein, such as some or all of those described in FIGS. 1-5.

Website scanner 150 may be implemented by the processor 142 executing the software instructions 148, and is generally configured to scan websites 124 to identify elements, sections, widgets, and components (collectively referred to herein as sections (e.g., sections 214 in FIG. 2)) displayed on each page of a website 124, in response to identifying the sections of a webpage, generate a user interface component (e.g., user interface component 217 of FIG. 2) for each section, display one or more user interface components 217 adjacent to each section of a webpage, where the one or more user interface components 217 include a button and a line drawn around a respective section, detect that a user interface component associated with a section of a webpage is actuated, in response, add a video scene 154 corresponding to the HTML code of the selected section to a list of video scenes 154 to be used to generate a video 156, detects that a button "e.g., "generate video" button) is actuated after one or more sections of the website 124 are selected and the corresponding HTML code of the selected sections is added to the list of video scenes 154, and in response, generate the video 156 that may comprise video scenes 154 associated with HTML code of sections in one or more web pages of the website 124. These operations are described in greater detail in the discussion of FIG. 2.

The machine learning algorithm 152 may be implemented by the processor 142 executing the software instructions 148, and is generally configured to generate, for a given task 158, one or more videos 156 whose video scenes 154 are selected based on historically visited sections of the website 124 when users 102 wanted to perform a respective task 158. In certain embodiments, the machine learning algorithm 152 may include a support vector machine, neural network, random forest, k-means clustering, Tree-based algorithm, Random Forest algorithm, etc. In certain embodiments, the machine learning algorithm 152 may be implemented by a plurality of neural network layers, convolutional neural network layers, Long-Short-Term-Memory (LSTM) layers, Bi-directional LSTM layers, recurrent neural network layers, and the like.

The machine learning algorithm 152 may be configured to be implemented by unsupervised, semi-supervised, and/or supervised machine learning algorithms. For example, the machine learning algorithm 152 may be trained based on a training dataset 160 that comprises a set of videos 156, where each video 156 is labeled with a respective task 158, navigation path 162, video scenes 154, and widget IDs 228. During the training phase, the machine learning algorithm 152 learns patterns and correlations between historically visited sections of the website 124 and the corresponding tasks 158 users 102 wanted to perform on the website 124. The machine learning algorithm 152 refines its understanding of user behavior by identifying relationships between website sections and user-initiated tasks 158. This training process enables the machine learning algorithm 152 to detect patterns indicative of user preferences and intentions when navigating the website 124.

For example, in some embodiments, the machine learning algorithm 152 may determine that a user 102 takes a first navigation path **162*a* to perform a first task 158*a*. In other words, the machine learning algorithm 152 may monitor and observe which sections the user 102 visits and what actions the user 102 performs on the website 124. For example, the first navigation path 162*a* may be that the user 102 has stopped scrolling on a second section of a first webpage of the website 124, clicked on a button associated with the second section of the first webpage, navigated to a second webpage of the website 124 and entered a profile number on a text field on a first section of the second webpage. The machine learning algorithm 152 may also determine that other users 102 have taken substantially similar navigation path 162*a* when they wanted to perform the first task 158*a*. In response, the machine learning algorithm 152 may associate the navigation path 162*a* of more often-visited sections (e.g., sections that are visited more than other sections of the website 124) to the first task 158*a*. Further, in response, the machine learning algorithm 152 may learn the association between the determined navigation path 162*a* to the first task 158*a***.

The machine learning algorithm 152 may further capture the widget IDs 228 associated with the visited sections from the source HTML code, associate the widget IDs **228*a*, *c*,** and *d* to the task **158*a*, and use the widget IDs 228*a*, *c*,** and *d* to generate a video **156*a* that comprises a set of HTML video scenes 154*a*, *e*,** and *f* of the visited sections along the navigation path **162*a*, and populate the training dataset 160 with the video 156*a* labeled with the task 158*a*, navigation path 162*a*, widget IDs 228*a*, *c*,** and *d*, and video scenes **152*a*. The widget IDs 228*a*, *e*,** and *f* of sections (**214*a*, *e*,** and *f*) are visited along the navigation path **162*a* to perform the first task 158*a*. Each widget ID 228 may be a title or otherwise an identifier of the section 214**.

In another example, in some embodiments, the machine learning algorithm 152 may elicit for a purpose of visiting the website 124 from the user 102, e.g., when the user 102 logs into their account profile on the website 124. For example, the video management device 140 (e.g., via the machine learning algorithm 152) may display a list of predefined tasks 158 on the website 124 and display a text message that requests the user 102 to select one of the tasks 158 that they want to perform on the website 124. The user 102 may select the task **158*a*. In response, the machine learning algorithm 152 may receive the user input, track the navigation path 162*a* of the user 102 on the website 124, fetch the widget IDs 228*a*, *e*,** and *f* from the source HTML code, generate the video scenes **154*a*, *e*,** and *f* in form of the HTML code of the visited sections identified based on the widget IDs **228*a*, *e*,** and *f*, generate a video **156*a* that comprises a set of HTML video scenes 154*a*, *e*,** and *f* of the visited sections along the navigation path **162*a*, and populate the training dataset 160 with the video 156*a* labeled with the task 158*a*, navigation path 162*a*, widget IDs 228*a*, *e*,** and *f*, and video scenes **154*a*, *e*,** and *f*.

The machine learning algorithm 152 may perform similar operations to populate the training dataset 160 with the video **156*b* and associate it with the respective task 158*b*, navigation path 162*b*, widget IDs 228*a*, *c*,** and *d*, and video scenes **154*a*, *c*,** and *d*, where the widget IDs **228*a*, *c*,** and *d* include widget IDs of sections that are visited along the navigation path **162*b* to perform the second task 158*b***.

Operational Flow for Interactive Video Generation

FIG. 2 illustrates an example operational flow 200 of system 100 (see FIG. 1) for generating a video 156 comprising a set of HTML video scenes 154 that are rendered based on HTML code of user-selected/visited sections on the website 124. The operational flow 200 may begin when the user 102 sends the video request 106 to the video management device 140 via the computing device 120. For example, when the user 102 visits a first webpage **210*a*, the user 102 may initiate sending the video request 106 by pressing or actuating the video request button 212 on the first webpage 210*a***. In response, the video management device

140 may receive the video request 106 and modify the HTML code of the web pages 210*a-b* of the website 124 as described below.

In this process, the video management device 140 may execute the website scanner 150 to perform the following operations. The website scanner 150 may scan the web pages 210*a-b* of the website 124 to identify the sections 214*a*, 214*b*, and 214*c* of the webpage 210*a* and section 214*d*, 214*e*, and 214*f* of the webpage 210*b*, assuming that these are all the sections of the web pages 210*a,b*. In some cases, the sections 214*a-f* may include charts, graphs, text fields, buttons, images, or any other elements that can be represented in HTML code and/or represent dynamic information that may be updated over time. The website scanner 150, upon identifying these sections, extracts and captures the HTML code associated with each of them. For example, the website scanner 150 may inspect the HTML code of the web pages 210*a-b* to detect the sections with tags "div" in the body of the HTML code to identify the sections 214*a-f*. The website scanner 150 may also capture the widget IDs 228*a-f* of these sections 214*a-f*. The website scanner 150 may refer to the widget IDs 228*a-f* to identify a section 214*a-f* and generate a video scene 154.

Modifying the HTML Code of the Website

After identifying the sections 214*a-f*, the website scanner 150 may modify the HTML code of the web pages 210*a-b* to add respective user interface components 217 to each section 214*a-f*. The user interface components 217 may act as identifiers to identify each section 214*a-f*. For example, the user interface components 217 for each section 214*a-f* may include a respective button 216*a-f* and a respective line 218*a-f* drawn around a respective section 214*a-f*. For example, the website scanner 150 may add HTML code corresponding to the user interface components 217 to the HTML code of the website 124 in a respective and appropriate section for each section 214*a-f* where it is defined in the HTML code of the website 124. In response, the website scanner 150 may load the modified HTML code of the webpage 210*a* and display button 216*a* and line 218*a* to the section 214*a*, button 216*b* and line 218*b* to the section 214*b*, button 216*c* and line 218*c* to the section 214*c*. When the webpage 210*b* is navigated to and loaded, the website scanner 150 may perform a similar operation and load the modified HTML code of the webpage 210*b*, display, and add the button 216*d* and line 218*d* to the section 214*d*, button 216*e*, and line 218*e* to the section 214*e*, and button 216*f* and line 218*f* to the section 214*f*, as shown in the example of FIG. 2. The line 218*a-f* around a respective section 214*a-f* may generally indicate a boundary area that would be shown in a respective video scene 154. This augmentation to the HTML code of the website 124 enables users 102 to easily select and interact with specific sections 214*a-f* of interest that they want to be added to the list 220 of video scenes 154.

Further in response to adding and displaying the user interface components 128, the website scanner 150 may modify the HTML code of the website 124 to add the visual representation of the list 220 of scene collection that is initially filled with empty placeholder designated spots which can be filled with video scenes 154 of sections 214*a-f* that the user 102 selects as the user 102 selects various sections 214*a-f*.

Now that the webpage 210*a* is modified to display the user interface component 217, the user 102 may start selecting one or more sections 214*a-c* of the webpage 210*a*. For example, assume that the user 102 wants to perform the first task 158*a*. In this example, the user 102 may click on the button 216*a* to actuate the button 216*a* if they want the section 214*a* to be added to the video 156. In response, the website scanner 150 fetches the HTML code of the section 214*a*, captures the widget ID 228*a*, generates the video scene 154*a* corresponding to the selected section 214*a*, and adds this video scene 154*a* to the list 220 of video scenes 154 as shown in the example of FIG. 2. The website scanner 150 also updates the visual representation of the list 220 and fills a first previously empty placeholder spot with the generated video scene 154*a*. This interaction enables the user 102 to curate a personalized list 220 of selected sections 214*a-f* to be included in the final video 156. As the user 102 clicks on buttons 216*a-f* corresponding to different sections 214*a-f* of interest, the website scanner 150 dynamically fetches the associated HTML code, generates video scenes 154, and populates the list 220 accordingly.

In the example of FIG. 2 assume that the user 102 navigates to the second webpage 210*b* by clicking a link on the first webpage 210*a*. In response, the modified HTML code of the second webpage 210*b* is loaded which causes the modified webpage 210*b* to be displayed. The modified webpage 210*b* may display the user interface components 217 associated with the sections 214*d-f*, including the button 216*d* and line 218*d* for the section 214*d*, button 216*e* and line 218*e* for the section 214*e*, and button 216*f* and line 218*f* for the section 214*f*, as shown in FIG. 2.

In response, the user 102 may continue to select one or more sections 214*d-f* of interest to be added to the list 220, similar to that described above with respect to the first webpage 210*a*. For example, assume that the user 102 clicks on the button 216*e* of the section 214*e*. In response, the website scanner 150 fetches the HTML code associated with section 214*e*, captures the widget ID 228*e*, generates a corresponding video scene 154*e* from the fetched HTML code, and adds the video scene 154*e* to the list 220. The website scanner 150 also updates the visual representation of the list 220 to fill a second designated spot with video scene 154*e*. The user 102 may select any number of sections 214 of interest and navigate to any number of web pages 210.

For example, the user 102 may select the section 214*f*, similar to that described above, by clicking on the corresponding button 216*f* of the section 214*f* on the second webpage 210*b*. In response, the website scanner 150 fetches the HTML code associated with section 214*f*, captures the widget ID 228*f*, generates the corresponding video scene 154*f*, and adds it to the list 220. The visual representation of the list 220 is updated accordingly.

Interacting with Elements in Each Video Scene

Assume that the user 102 had finished performing the task 158 and selected the desired sections 214*a*, 214*e*, and 214*f*. Therefore, the list 220 may include the video scenes 154*a*, 154*e*, and 154*f*. The user 102 may view the video scenes 154*a*, 154*e*, and 154*f* when clicking on them from the list 220. Each video scene 154 may be associated with a playback time that may vary depending on a type of interaction performed by the user 102 in a respective section 214, and the content and characteristics of the selected sections 214. For example, the video scene 154*a* may have a playback time of 5 seconds if section 214*a* includes a simple text that can be read in 5 seconds and/or the user 102 has visited the section 214*a* for 5 seconds or less, the video scene 154*e* may have a playback time of 30 seconds if the section 214*e* includes a graph with information that can be observed in less than 30 seconds and/or the user 102 has visited the section 214*e* for 30 seconds or less, and the video scene 154*f* may have a playback time of 20 seconds if the section 214*f* includes a table or chart with information that can be observed in less than 20 seconds and/or the user 102 has visited the section 214*e* for 20 seconds or less.

Upon clicking on a particular video scene 154 in the list 220, the video management device 140 may initiate the playback of the corresponding video scene 154. The user 102 is able to interact and engage with the content of a selected video scene 154 while it is being played. For example, the user 102 can click on interactive HTML code elements within the video scene 154 and navigate through different sections 214 embedded in the video scenes 154.

The video scenes 154 include interactive HTML code elements 222 that allow users to interact with the video scenes 154. Allowing users 102 to interact with video scenes 154 increases the efficiency of the system 100 of FIG. 1 because the users 102 do not need to be redirected to different places (e.g., web pages 210) and bounce around to find and use the information they want. Instead, users 102 can stay on and interact with the video scenes 154 to find the information they want. By doing this, users 102 can avoid being redirected to multiple places and the system 100 can avoid reloading or rebuffering the same web pages or content. This reduces the response time of the system 100 and conserves computing resources, memory, and network resources.

Generating the Interactive Video

When the user 102 is ready for the video 156 to be generated, they may click on the button 226. In response, the video management device 140 may start the video generation process. The video management device 140 is equipped with tools and libraries (e.g., included in the software instructions 148 of FIG. 1) designed to facilitate the creation of an interactive video using the video scenes 154 stored in the scene collection within the list 220. Its configuration involves receiving the list 220 of the scene collection, processing the video scenes 154 contained in the list, and generating an interactive video based on these video scenes 154.

In some embodiments, the video management device 140 may map the video scenes 154 to a timeline for the interactive video 156. Specifically, the video management device 140 may display each video scene 154 with a respective animation 224. In some embodiments, each animation 224 may include one or more frames. For example, animation 224 assigned to a specific video scene 154 may comprise frames depicting different stages or sequences of areas where the user interacted with those areas of the section 214 within that video scene 154.

The video management device 140 may map the video scenes 154 to a pre-determined timeline. In some embodiments, the pre-determined timeline is determined based on the ordering of video scenes 154 added to in the list 220. The video management device 140 may render the video scenes 154 in the received scene collection of the list 220. The video management device 140 comprises tools and libraries (e.g., included in the software instructions 148 of FIG. 1) to support parsing a markup language (e.g., HTML), analyzing elements in the markup language, and creating a formalized layout of the elements. For example, the video management device 140 may parse the video scenes 154 in the form of an HTML page, to analyze the interactive HTML code elements 222 in the HTML page, and to create a layout of the HTML page including widgets implemented by the interactive HTML code elements 222.

The video management device 140 may render the animations 224 associated with a video scene 154. The video management device 140 creates an interactive video 156 by including the animations 224 in the rendered video scenes 154. The video management device 140 may playback the video 156 generated based on the rendered scene collection of the video scenes 154. The video management device 140 may be configured to map the timeline of the frames and/or the animations 224 to a progress bar 227 and to play the video 156 for the user 102. The video management device 140 plays the video 156 in the form of a series of HTML pages while allowing users 102 to pause and interact with the interactive HTML code elements 222 implemented as widgets in the video 156. In this way, the system 100 provides users 102 with an interactive video experience with drill-down capabilities, which supports customization and personalization for individual users 102.

The video management device 140 may generate a progress bar 227 for the generated video 156. The progress bar 227 provides a user interface and a visual representation of the progression through the interactive video 156. The progress bar 227 is associated with the timeline of the video scenes 154 and their respective animations 224. The progress bar 227 acts as a dynamic indicator to illustrate the temporal advancement of the interactive video 156.

The video management device 140 enables the user 102 to pause the video 156 using the pause button of the progress bar 227 and interact with interactive HTML code element 222 of a desired video scene 154. For example, based on a type of the user interaction with an interactive HTML code element 222 of a video scene 154, the video scene 154 is modified according to the type of the user interaction. For example, if the user 102 interacts with a button embedded in an interactive HTML code element 222, the video management device 140 may trigger a specific action, such as displaying additional information related to the selected content or navigating to a different section 214 of the video 156 and/or website 124. In another example, if the user 102 fills a text field of an interactive HTML code element 222 within a video scene 154, the video management device 140 may dynamically modify the displayed content based on the entered text.

In some embodiments, the video scenes 154 may serve as a dynamic representation of selected sections 214 of the website 124 in an ordered series in the video 156 to allow the user 102 to perform the desired task 158 within the video 156 without having to leave the video 156 and navigate to different web pages 210 of the website 124.

After the video 156 is played for the user 102, the video management device 140 may display the list of scene collections in the list 220 and allow the user 102 to select and unselect any of the video scenes 154. The video management device 140 may generate a dynamic name/title for each video scene 154. For example, a title of a video scene 154 may be determined based on a widget ID 228 of the corresponding section 214 as indicated in the HTML code of the corresponding section 214. When generating the video 156, the video management device 140 may capture the widget IDs 228 of the selected sections 214 from the HTML code of the website 124 and store the widget IDs 228 in the memory 146 (see FIG. 1) for the video 156 associated with the task 158. Therefore, the next time the video management device 140 determines that a user 102 wants to perform the task 158, the video management device 140 may fetch the widget IDs 228 associated with the sections 214 linked to the task 158, generate an updated/modified video scene 154 in form of HTML scenes by fetching an updated HTML code of the sections 214, and generate an updated/modified video 156 by combining the updated/modified video scenes 154 along with their respective animations based on the predetermined timeline.

Therefore, each time a video 156 associated with a task 158 is requested to be displayed, the video management device 140 may display an updated video 156 that reflects the current state and content of the website 124, as indicated by the updated/modified video scenes 154. Thus, the video content remains synchronized with the latest changes in the HTML code of the sections 214 linked to the task 158.

After the user 102 selects which video scenes 154*a*, 154*e*, and 154*f*, they want to be saved to be included in the video 156, the user 102 may press or actuate the button 230. In response, the video 156 is generated to include the selected video scenes 154*a*, 154*e*, and 154*f*. The video management device 140 may add the generated video 156 to the video gallery 232 and display the list of generated videos 156 on a designated portion of the website 124. The user 102 may view the list of generated videos 156, each indicated with a respective name of a task 158. The video gallery 232 may be displayed on subsequent occasions when the user 102 logs into their profile on the website 124. Thus, each time the user 102 wants to perform a task 158 on the website 124, the user 102 may select a corresponding video 156 from the video gallery 232. In response, the video management device 140 fetches the widget IDs 228 of the sections 214 associated with the selected video 156, generates an updated video scene 154 by fetching the current statuses of the HTML code for the associated sections 214, and generates an updated video 156 based on the updated video scenes 154 along with the respective animations 224.

Generating Interactive Videos Based on Historical Visits to the Website

In some embodiments, the video management device 140 may implement manual video scene collection by users 102 as described above. In some embodiments, the video management device 140 may implement the machine learning algorithm 152 to generate automated and machine learning-based videos 156, similar to that described in FIG. 1. In this process, the video management device 140 implements the machine learning algorithm 152 to automate the generation of videos 156 based on historical user interactions (e.g., associated with navigation paths 162) with the website 124. The machine learning algorithm 152 may perform tasks such as video scene selection, pattern recognition, user navigation path determination, and association with specific tasks 158. In response, new videos 156 may be generated based on historically visited sections 214 of the website 124 for each task 158 and added to the video gallery 232 along with the respective tiles of the tasks 158.

In some embodiments, the video management device 140 may populate the video gallery 232 with the videos 156 generated by the machine learning algorithm 152 for a specific user 102 who logs into their portal even if a video 156 was not generated based on historical visits of the specific user 102 to the website 124. Thus, the users 102 are presented with task-specific videos 156 associated with any task 158 and the video gallery 232 becomes a comprehensive repository that offers users 102 a diverse collection of videos 156 tailored to any tasks 158 that can be performed on the website 124 and preferences of the users 102.

Converting Non-Responsive HTML Code Elements into Responsive Elements

In some embodiments, the video management device 140 be configured to identify non-responsive HTML code elements 222 of section 214 and convert/transform them into respective HTML code element 222. In this process, the video management device 140, e.g., via the website scanner 150, may identify HTML code elements 222 that may not inherently respond well to dynamic rendering or may not be conducive to a smooth interactive video experience. These non-responsive HTML code elements 222 may include static-sized elements, such as static-sized text, static images, fixed-size containers, or other components that do not easily adjust to different screen sizes or frame sizes on which they are being displayed.

In some examples, the size of the HTML code element 222 may be defined in a respective Cascading Style Sheets (CSS) code. A responsive HTML code element 222 is designed to adapt and scale effectively across various devices and screen sizes. On the other hand, a non-responsive HTML code element may not dynamically adapt to varying screen sizes or orientations. Thus, in some embodiments, the website scanner 150 is configured to detect non-responsive HTML code elements 222 by analyzing the structure and characteristics of the HTML code within a given section 214. If the website scanner 150 identifies that a HTML code element 222 is defined with static size, the website scanner 150 may determine that the HTML code element 222 is non-responsive. In response, the website scanner 150 may define a dynamic size attribute to the non-responsive HTML code element 222 to convert the non-responsive HTML code element 222 to a responsive counterpart, fetch the responsive HTML code element 222 from the code portion of the HTML code element 222, and update the video scene 154 to include the responsive HTML code element 222.

The website scanner 150 may use the generated responsive HTML code element 222 when generating the respective video scene 154. Thus, the video scene 154 and video 156 may display dynamic and responsive HTML code elements 222 when played.

The operational flow 200 may be performed in any given website 124 and for any use case. For example, the operational flow 200 may be performed for use cases, including when clients or users 102 of an organization visit the website 124 of the organization to perform tasks 158, when users of the organization of the website 124 visit the website 124 to perform tasks 158, among others.

Example Method for Generating Interactive and Dynamic Video Based on Selected Sections of a Website FIG. 3 illustrates an example flowchart of a method 300 for generating interactive and dynamic video 156 based on selected sections 214 of a website 124, according to some embodiments. Modifications, additions, or omissions may be made to method 300. Method 300 may include more, fewer, or other operations. For example, operations may be performed in parallel or in any suitable order. While at times it is discussed that the system 100, computing devices 120, video management device 140, or components of any of thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 302-320.

At operation 302, the video management device 140 (e.g., via the website scanner 150) may detect a set of sections 214 (e.g., sections 214*a-c*) of a first webpage 210*a* of the website 124. For example, the video management device 140 may execute the website scanner 150 to detect the sections 214. The website scanner 150 may also detect the sections of other web pages 210 of the website 124, such as sections 214*d-f* of the webpage 210*b*, similar to that described in FIG.

2. The operation 302 may be performed in response to receiving the video request 106, similar to that described in FIG. 2.

At operation 304, the video management device 140 may generate a user interface component 217 for each of the set of sections 214. For example, the video management device 140, e.g., via the website scanner 150 may modify the HTML code of the website 124 to add the HTML code of the user interface components 217 to original HTML code of the website 124 and display the user interface components 217 on the displayed web page 210, similar to that described in FIG. 2.

At operation 306, the video management device 140 may display the user interface components 217 for each of the sections 214. At operation 308, the video management device 140 may determine whether a section 214 is selected. For example, the video management device 140 may determine that a section 214 is selected if a user interface component 217 (e.g., button 216) associated with the section 214 is actuated, e.g., by the user 102. If the video management device 140 determines that a section 214 is selected, the method 300 proceeds to operation 310. Otherwise, the method 300 keeps monitoring activities and interactions with the user interface components 217 at operation 308.

At operation 310, the video management device 140 fetches the corresponding HTML code of the selected section 214, for example, from the original HTML code of the website 124. At operation 312, the video management device 140 generates a video scene 154 based on the corresponding HTML code of the selected section 214, similar to that described in FIG. 2.

At operation 314, the video management device 140 adds the video scene 154 to the scene collection in the list 220. In other words, in response to detecting that the user interface component 217 associated with a section 214 is actuated, the video management device 140 may add the section 214 to be used to generate the video 156.

At operation 316, the video management device 140 determines whether an additional section 214 is selected, similar to that described in operation 308. If the video management device 140 determines that no additional section 214 is selected, the method 300 may proceed to operation 318. Otherwise, the method 300 may return to operation 310.

At operation 318, the video management device 140 may determine whether a request 234 to generate the video 156 is received. For example, the video management device 140 may determine that the request 234 is received when the button 226 is actuated, e.g., by the user 102. If the video management device 140 determines that the request 234 is received, the method 300 may proceed to operation 320. Otherwise, the method 300 may remain at operation 318 and wait until the request 234 is received.

At operation 320, the video management device 140 may generate the video 156 by combining the video scenes 154, similar to that described in FIG. 2. For example, the video management device 140 may fetch the HTML code associated with the selected sections 214, generate video scenes 154 displaying respective sections 214 (in response to loading and rendering the HTML code sections), and generate the video 156 comprising the video scenes 154 in the order indicated in the scene collection in the list 220.

Figure 4:
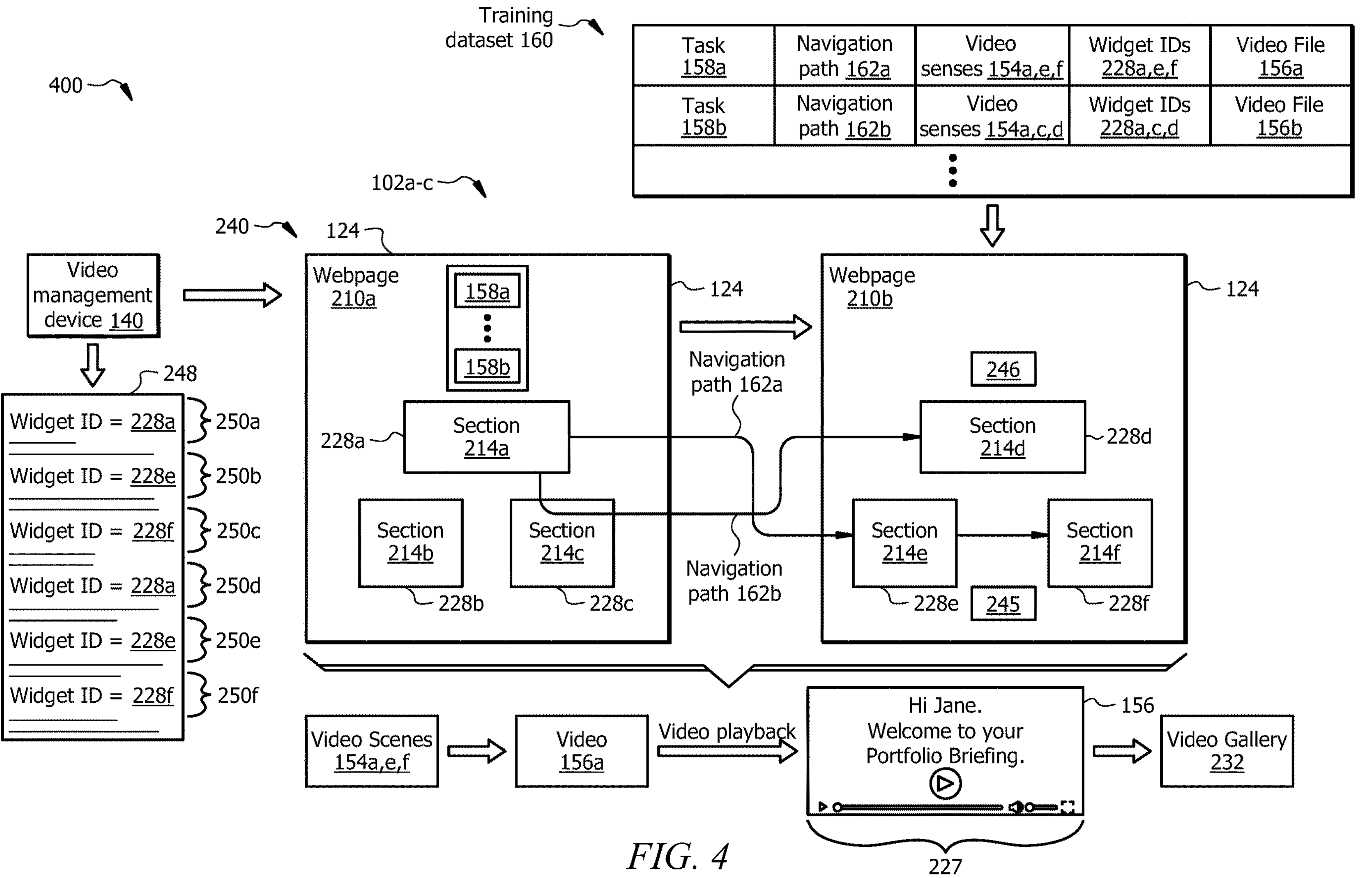
FIG. 4 illustrates an example operational flow of the system 100 of FIG. 1 for automating a video generation based on historical visits to a website.

Operational Flow for Generating Interactive and Dynamic Video Based on Historical Visits to a Website FIG. 4 illustrates an operational flow 400 of system 100 of FIG. 1 for generating interactive and dynamic video 156 based on historically-visited sections of a website 124. In some embodiments, any operation and component described in the discussion of FIGS. 2 and 3 may be performed in conjunction with the operational flow 400, and vice versa. In an example scenario, assume that a first user **102*a* wants to perform a first task 158*a* on the website 124. In this example scenario, the first user 102*a* may visit the webpage 210*a* of the website 124, where the webpage 210*a* may be a home page of the website 124. In some embodiments, the video management device 140 may determine that the first user 102*a* wants to perform the first task 158*a* on the website 124 by displaying a message 240 that requests a purpose of visiting the website 124 and receiving a user input from the user 102*a* that indicates the first task 158*a*. For example, the message 240 may include a list of task options (e.g., tasks 158*a*, 158*b*, etc.) that are selectable for users 102. The user 102*a* can select the first task 158*a* from the list to indicate that they want to perform the first task 158*a* on the website 124**.

In response, the video management device 140 (e.g., via the machine learning algorithm 152 and/or website scanner 150) may detect a navigation path **162*a* that is being traversed (by the user 102*a*) through the website 124. In this process, the video management device 140 monitors the user activity and interactions with various sections 214 of the website 124. For example, if the user 102*a* clicks on a button, a link, or other element of the section 214*a*, the video management device 140 may determine that the user 102*a* has interacted with or otherwise visited the section 214*a*. In response, the video management device 140 may add visiting the section 214*a* to the navigation path 162*a* of the user 102*a* for performing the first task 158*a***.

In the example of FIG. 4, assume that the user **102*a* visits or otherwise interacts with elements of the sections 214*a*, 214*e*, and 214*f* in this specific order. For each of these interactions, the video management device 140 dynamically appends the corresponding sections to the ongoing navigation path 162*a*. This continuous tracking and updating process allows the system to determine the user's journey through the website 124 to generate the navigation path 162*a* that indicates the user's historical interactions with various sections 214. At each interaction with a section 214, the video management device 140 fetches the corresponding widget ID 228 to the section 214 to be used to identify the section 214 when generating a respective video scene 154 and video 156, similar to that described in FIGS. 2 and 3**.

In the example of FIG. 2, the video management device 140 may fetch the widget ID **228*a* of the section 214*a*, widget ID 228*e* of the section 214*e*, and widget ID 228*f* of the section 214*f*. In some embodiments, the video management device 140 may determine that the navigation path 162*a* is completed (and/or the task 158*a* is performed) when it detects that a threshold time period 242 has passed and no user interaction or activity is registered or detected on the website 124 by the user 102*a*. The threshold time period 242** may be one minute, two minutes, five minutes, etc.

In some embodiments, the video management device 140 may determine that the navigation path **162*a* is completed (and/or the task 158*a* is performed) in response to displaying a message 245 on the website 124 requesting feedback from the user 102*a* requesting whether the first task 158*a* was performed. If the user 102*a* responds that the task 158*a* is performed, the video management device 140 may determine that the navigation path 162*a* is completed (and/or the task 158*a* is performed). In some examples, the message 225 may have two options, one option may indicate that the first task 158*a* is not performed, and the other option may indicate that the first task 158*a* is performed successfully. In response to detecting that the navigation path 162***a* is completed, the video management device 140 may associate the first task 158*a* to the navigation path 162*a*.

The video management device 140 may also add the navigation path 162*a* associated with the first task 158*a* to the training dataset 160 for analysis in further user visits. The video management device 140 may fetch the HTML code portion 250*a*, 250*e*, and 250*f* (see FIG. 4) of each of the visited sections 214*a*, 214*e*, and 214*f*, respectively, and generate each of the video scenes 154*a*, 154*e*, and 154*f* based on the respective HTML code portion 250*a*, 250*e*, and 250*f* and animation, similar to that described in FIGS. 2 and 3.

In some embodiments, the video management device 140 may perform a similar operation to generate a video scene 154 as described in FIGS. 1-3. The video management device 140 may generate a first video 156*a* that comprises a set of video scenes 154*a*, 154*e*, and 154*f*. The video management device 140 may generate the first video 156*a* similar to that described in FIGS. 1-3. In some embodiments, the first video 156*a* may display or show data that is specific to the first user 102*a*. For example, when the user 102*a* logs into their profile on the website 124, the website 124 fetches the user information associated with the user 102*a* from a memory or database, and displays the user information associated with the user 102*a* on sections 214 that are programmed or configured to display the user information. Thus, the first video 156*a* displays information associated with the first user 102*a* because the current status of the HTML code of the website 124 visited by the user 102*a* is updated to include the information associated with the first user 102*a*. Therefore, in some examples, the sections 214*a, e*, and *f* may include sections that represent dynamic information that is updated with user information associated with a user who is visiting the website 124. The user information may include user profile information, user's name, address, serial number, a graph or table of numbers or other data indicating the user's interactions with other users, entities, organizations, and the like.

The video management device 140 may perform similar operations for multiple users to determine the sections 214 that are historically visited more than other sections 214 of the website 124 for performing the task 158*a*. For example, the video management device 140 may determine sections 214 that are historically visited more than a threshold number ratio (e.g., more than three times) compared to other sections 214 of the website 124 when users 102 indicated that they wanted to perform the first task 158*a* and that are common across multiple users' visits of the website 124. For example, the video management device 140 accumulates data on user activities and interactions with various sections 214 of the website 124 over time. This data includes information on which sections 214 user visits, how long they spend on each section 214, and the specific actions they take within those sections 214. To further validate the relationship of these sections 214 with the first task 158*a*, the video management device 140 checks whether they are common across multiple users' visits. If several users 102-*a-c* have independently visited the same section 214 multiple times when trying to perform the first task 158*a*, it indicates that this section 214 is indeed needed to be associated to the task 158*a*. In this way, the video management device 140 may determine a more accurate and common navigation path 162*a* for performing the task 158*a* across users. The video management device 140 may use this information for other user's visit to the website 124 if they want to perform the task 158*a*. Similar operations may be performed for each task 158*a-b*.

Using the Historically Visited Sections to Generate an Updated Video

Subsequent to the first user 102*a* visiting the website 124, assume that a second user 102*b* wants to perform the first task 158*a* on the website 124. In this example, the second user 102*b* may visit the website 124 and indicate that they want to perform the first task 158*a*. In some embodiments, the video management device 140 may determine that the second user 102*b* wants to perform the first task 158*a* on the website 124 by displaying a message 240 that requests a purpose of visiting the website 124 and receiving a user input that indicates the first task 158*a*. The user 102*b* can select the first task 158*a* from the list to indicate that they want to perform the first task 158*a* on the website 124. In response, the video management device 140 may search in the training dataset 160 to identify a row entry that includes the task 158*a*. In the example of FIG. 4, because the training dataset 160 includes an entry with the task 158*a* (based at least on the user 102*a*'s visit to the website 124 to perform the task 158*a*), the video management device 140 identifies the respective entry. In response, the video management device 140 may fetch the information associated with the first task 158*a*. For example, the video management device 140 may fetch the widget IDs 228*a, e*, and *f* from the code 248 of the website 124.

The video management device 140 may use the widget IDs 228*a, e*, and *f* to identify the code portions 250*a, e*, and *f* associated with the sections 214*a, e*, and *f*, respectively. The HTML code portions 250 may be further identified based on respective HTML tags. The video management device 140 may fetch the HTML code portions 250*a, e*, and *f* of the sections 214*a, e*, and *f* based on the widget IDs 228*a, e*, and *f*. The fetched HTML code portions 250*a, e*, and *f* represent updated status of the sections 214*a, e*, and *f* based on the current information that is presented on the website 124. In response, the video management device 140 may use the HTML code portions 250*a, e*, and *f* of the sections 214*a, e*, and *f* to generate the video scenes 154*a, e*, and *f*, respectively. The video scenes 154*a, e*, and *f* display the updated status of the sections 214*a, e*, and *f* because the updated HTML code of the sections 214*a, e*, and *f* are used to generate video scenes 154*a, e*, and *f*, respectively. The video management device 140 may generate a second video 156*a* that comprises the updated video scenes 154*a, e*, and *f*.

The second video 156*a* may display information associated with the second user 102*b* because the current status of the HTML code of the website 124 visited by the user 102*b* may be updated to include the information associated with the second user 102*b*. For example, when the user 102*b* logs into their profile on the website 124, the website 124 fetches the user information associated with the second user 102*b* from a memory or database, and displays the user information associated with the second user 102*b* on sections 214 that are programmed or configured to display the user information.

The video management device 140 may display the generated second video 156*a* on the website 124. The video 156*a* may show the navigation path 162*a* to perform the first task 158*a* on the website 124. For example, the video management device 140 may display a video player on a section of the website 124 and allows the user 102*b* to play back the video with a play button of the slider bar 227, similar to that described in FIG. 2. The user 102*b* may watch the video 156*a* which includes the updated video scenes 154*a, e*, and *f*, and perform the task 158*a* within the video 156*a* and without having to manually navigate to different pages of the website 124 to perform the task 158*a*. The video management device 140 may display a message 246 that indicates that the generated second video 156*a* shows the navigation path 162*a* to perform the first task 158*a* on the website 124. In this manner, the video management device 140 may provide guidance to the user 102*b* to perform the task 158*a* and allow the user 102*b* to perform the task 158*a* within the frame of the video 156*a*. The video management device 140 may add the video 156*a* to the video gallery 232 and make it available for further user's visits, similar to that described in FIGS. 2 and 3.

In some embodiments, the video management device 140 may perform a similar operation for any task 158. For example, assume that the video management device 140 determines that a third user 102*c* wants to perform a second task 158*b* on the website 124, similar to that described above with respect to the first task 158*a*. for example, the video management device 140 may display the message 240 on the website and the third user 102*c* may select the second task 158*b*. In response, the video management device 140 may search the training dataset 160 to find an entry that includes the second task 158*b*. In response to finding the entry with the second task 158*b*, the video management device 140 may fetch the widget IDs 228*a, c*, and *d* associated with sections 214*a, c*, and *d* visited along the navigation path 162*b*.

The video management device 140 may use the fetched widget IDs 228*a, c*, and *d* to fetch the current status of HTML code portions 250*a, c*, and *d* associated with the historically visited sections 214*a, c*, and *d*, respectively. The video management device 140 may generate updated video scenes 154*a, c*, and *d* based on the current status of the HTML code portions 250*a, c*, and *d* of the sections 214*a, c*, and *d*, respectively. The video management device 140 may generate a third video 156*b* that comprises updated video scenes 154*a, c*, and *d*, display the third video 156*b* on the website 124, and display a message 245 that indicates the third video 156*b* shows the navigation path 162*b* to perform the second task 158*b* on the website 124.

Figure 5:
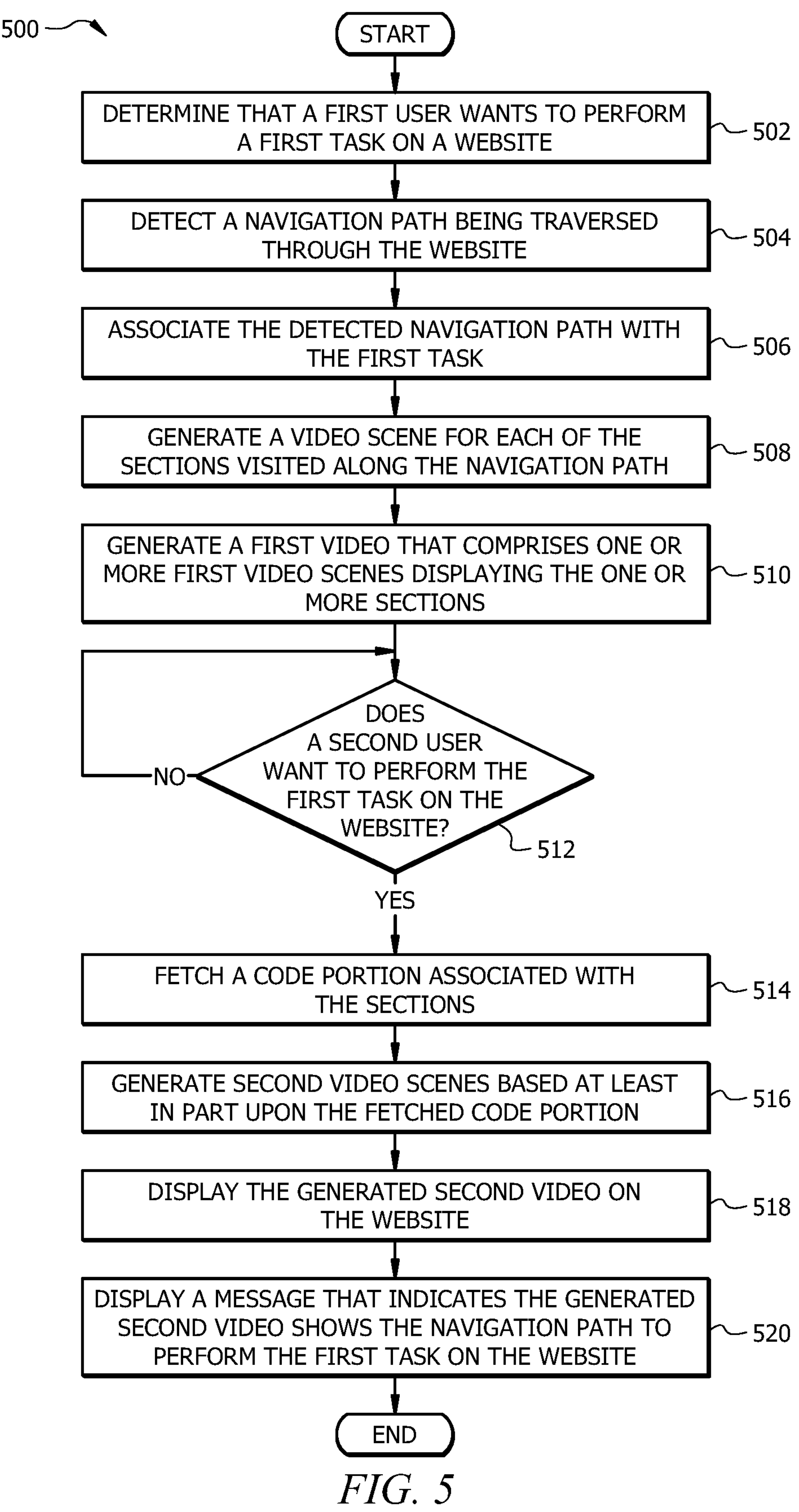
FIG. 5 illustrates an example flowchart of a method to automate video generation based on historical visits to a website.

Example Method for Generating Interactive and Dynamic Video Based on Historically-Visited Sections of a Website FIG. 5 illustrates an example flowchart of a method 500 for generating interactive and dynamic video 156 based on selected sections 214 of a website 124, according to some embodiments. Modifications, additions, or omissions may be made to method 500. Method 500 may include more, fewer, or other operations. For example, operations may be performed in parallel or in any suitable order. While at times it is discussed that the system 100, computing devices 120, video management device 140, or components of any of thereof perform some operations, any suitable system or components of the system may perform one or more operations of the method 500. For example, one or more operations of method 500 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 502-520.

At operation 502, the video management device 140 determines that a first user 102*a* wants to perform a first task 158*a* on the website 124, similar to that described in FIG. 4. At operation 504, the video management device 140 detects a navigation path 162*a* that is being traversed through the website 124. Detecting the navigation path 162*a* may include detecting user interactions with the sections 214*a, e*, and *f* that the user 102*a* visits on the website 124.

At operation 506, the video management device 140 associates the detected navigation path 162*a* to the first task 158*a*. At operation 508, the video management device 140 generates a video scene 154*a, e*, and *f* for each of the sections 214*a, e*, and *f* visited along the navigation path 162*a*. At operation 510, the video management device 140 generates a first video 156*a* which comprises video scenes 154*a, e*, and *f* that display the sections 214*a, e*, and *f*, respectively, similar to that described in FIGS. 1-4. The video management device 140 may add an entry with the first video 156*a* associated with the task 158*a*, navigation path 162*a*, video scenes 154*a, e*, and *f*, and widget IDs 228*a, e*, and *f* to the training dataset 160. The video management device 140 may use this information for future user visits, and if it determines that a user wants to perform the first task 158*a*, the video management device 140 may generate an updated video 156*a* with updated HTML code of the sections 214*a, e*, and *f* and display the updated video 156*a* for the user.

At operation 512, the video management device 140 determines whether a second user 102*b* wants to perform the first task 158*a* on the website 124, similar to that described in FIG. 4. At operation 514, the video management device 140 fetches a code portion associated with the sections 214*a, e*, and *f* from the source HTML code of the website 124. At operation 516, the video management device 140 generates second video scenes 154*a, e*, and *f* based on the fetched code portions, similar to that described in FIGS. 1-4. At operation 518, the video management device 140 displays the generated second video 156*a* on the website 124, similar to that described in FIG. 4. At operation 520, the video management device 140 displays a message 245 that indicates the generated second video 156*a* shows the navigation path 162*a* to perform the first task 158*a* on the website 124, similar to that described in FIG. 4.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for a video generation based on historical visits to a website, comprising:

a memory configured to store code associated with a website; and a processor, operably coupled to the memory, and configured to:

determine that a first user wants to perform a first task on the website;

in response to determining that the first user wants to perform the first task on the website:

detect a navigation path that is being traversed through the website, wherein the navigation path is detected in response to detecting user interaction with one or more sections of the website;

associate the detected navigation path with the first task; and generate a first video that comprises one or more first video scenes displaying the one or more sections;

determine that a second user wants to perform the first task on the website; and in response to determining that the second user wants to perform the first task on the website:

fetch a code portion associated with the one or more sections;

generate one or more second video scenes based at least in part upon the fetched code portion, wherein the generated one or more second video scenes display an updated status of the one or more sections;

generate a second video that comprises the one or more second video scenes; and display the generated second video on the website, wherein the second video shows the navigation path to perform the first task on the website.

2. The system of claim 1, wherein determining that the first user wants to perform the first task on the website comprises:

displaying a message that requests a purpose of visiting the website; and receiving a user input that indicates the first task.

3. The system of claim 1, wherein the navigation path comprises the one or more sections that are visited more than other sections of the website.

4. The system of claim 1, wherein the processor is further configured to:

determine that a third user wants to perform a second task on the website; and in response to determining that the third user wants to perform the second task on the website:

fetch a second code portion associated with historically visited sections of the website that are associated with the second task;

generate one or more third video scenes based at least in part upon the fetched second code portion, wherein the generated one or more third video scenes display an updated status of the fetched second code portion;

generate a third video that comprises the one or more third video scenes; and display the generated third video on the website, wherein the third video shows a second navigation path to perform the second task on the website.

5. The system of claim 1, wherein determining that a second user wants to perform the first task on the website comprises:

displaying a message that requests a purpose of visiting the website; and receiving a user input that indicates the first task.

6. The system of claim 1, wherein:

at least one of the one or more sections displays dynamic information that is updated with user information associated with a user who is visiting the website;

the first video shows data specific to the first user; and the second video shows data specific to the second user.

7. The system of claim 1, wherein while the second video is playing and when the second user interacts with a particular component being displayed on the second video, the second video is modified according to a type of interaction with the particular component.

8. A method for a video generation based on historical visits to a website, comprising:

storing code associated with a website;

determining that a first user wants to perform a first task on the website;

in response to determining that the first user wants to perform the first task on the website:

detecting a navigation path that is being traversed through the website, wherein the navigation path is detected in response to detecting user interaction with one or more sections of the website;

associating the detected navigation path with the first task; and generating a first video that comprises one or more first video scenes displaying the one or more sections;

determining that a second user wants to perform the first task on the website; and in response to determining that the second user wants to perform the first task on the website:

fetching a code portion associated with the one or more sections;

generating one or more second video scenes based at least in part upon the fetched code portion, wherein the generated one or more second video scenes display an updated status of the one or more sections;

generating a second video that comprises the one or more second video scenes; and displaying the generated second video on the website, wherein the second video shows the navigation path to perform the first task on the website.

9. The method of claim 8, wherein determining that the first user wants to perform the first task on the website comprises:

displaying a message that requests a purpose of visiting the website; and receiving a user input that indicates the first task.

10. The method of claim 8, wherein the navigation path comprises the one or more sections that are visited more than other sections of the website.

11. The method of claim 8, further comprising:

determining that a third user wants to perform a second task on the website; and in response to determining that the third user wants to perform the second task on the website:

fetching a second code portion associated with historically visited sections of the website that are associated with the second task;

generating one or more third video scenes based at least in part upon the fetched second code portion, wherein the generated one or more third video scenes display an updated status of the fetched second code portion;

generating a third video that comprises the one or more third video scenes; and displaying the generated third video on the website, wherein the third video shows a second navigation path to perform the second task on the website.

12. The method of claim 8, wherein determining that a second user wants to perform the first task on the website comprises:

displaying a message that requests a purpose of visiting the website; and receiving a user input that indicates the first task.

13. The method of claim 8, wherein:

at least one of the one or more sections displays dynamic information that is updated with user information associated with a user who is visiting the website;

the first video shows data specific to the first user; and the second video shows data specific to the second user.

14. The method of claim 8, wherein while the second video is playing and when the second user interacts with a particular component being displayed on the second video, the second video is modified according to a type of interaction with the particular component.

15. A non-transitory computer-readable medium storing instructions that when executed by a processor, cause the processor to:

store code associated with a website;

determine that a first user wants to perform a first task on the website;

in response to determining that the first user wants to perform the first task on the website:

detect a navigation path that is being traversed through the website, wherein the navigation path is detected in response to detecting user interaction with one or more sections of the website;

associate the detected navigation path with the first task; and generate a first video that comprises one or more first video scenes displaying the one or more sections;

determine that a second user wants to perform the first task on the website; and in response to determining that the second user wants to perform the first task on the website:

fetch a code portion associated with the one or more sections;

generate one or more second video scenes based at least in part upon the fetched code portion, wherein the generated one or more second video scenes display an updated status of the one or more sections;

generate a second video that comprises the one or more second video scenes; and display the generated second video on the website, wherein the second video shows the navigation path to perform the first task on the website.

16. The non-transitory computer-readable medium of claim 15, wherein determining that the first user wants to perform the first task on the website comprises:

displaying a message that requests a purpose of visiting the website; and receiving a user input that indicates the first task.

17. The non-transitory computer-readable medium of claim 15, wherein the navigation path comprises the one or more sections that are visited more than other sections of the website.

18. The non-transitory computer-readable medium of claim 15, wherein the instructions further cause the processor to:

determine that a third user wants to perform a second task on the website; and in response to determining that the third user wants to perform the second task on the website:

fetch a second code portion associated with historically visited sections of the website that are associated with the second task;

generate one or more third video scenes based at least in part upon the fetched second code portion, wherein the generated one or more third video scenes display an updated status of the fetched second code portion;

generate a third video that comprises the one or more third video scenes; and display the generated third video on the website, wherein the third video shows a second navigation path to perform the second task on the website.

19. The non-transitory computer-readable medium of claim 15, wherein determining that a second user wants to perform the first task on the website comprises:

displaying a message that requests a purpose of visiting the website; and receiving a user input that indicates the first task.

20. The non-transitory computer-readable medium of claim 15, wherein:

at least one of the one or more sections displays dynamic information that is updated with user information associated with a user who is visiting the website;

the first video shows data specific to the first user; and the second video shows data specific to the second user.

* * * * *